Oct. 20, 1942.　　J. E. AVERBACH　　2,299,607
FITTING
Filed Feb. 24, 1941　　　　2 Sheets-Sheet 1

INVENTOR.
JACOB E. AVERBACH
BY
ATTORNEYS

Oct. 20, 1942.　　　J. E. AVERBACH　　　2,299,607
FITTING
Filed Feb. 24, 1941　　　2 Sheets-Sheet 2

INVENTOR.
JACOB E. AVERBACH
ATTORNEYS

Patented Oct. 20, 1942

2,299,607

UNITED STATES PATENT OFFICE 2,299,607

FITTING

Jacob E. Averbach, Detroit, Mich., assignor of one-third to Lloyd Gasdick, Detroit, Mich., and one-third to Milton A. Pixley, Columbus, Ohio Application February 24, 1941, Serial No. 380,365

12 Claims. (Cl. 174—41)

This invention relates to improvements in fittings and refers more particularly to fittings for use in connection with supporting electrical equipment from structural elements.

It is one of the principal objects of this invention to improve generally the installation of electrical equipment on suitable supporting structure by providing a fitting composed of a relatively few simple parts capable of being readily manipulated to connect the equipment to and disconnect the equipment from the supporting structure.

While fittings constructed in accordance with this invention may be advantageously used in many different types of installations, nevertheless, they find particular utility when employed in combination with supporting elements, such as messenger cables, for attaching electrical equipment to the structural members usually incorporated in the superstructure of industrial plants. To this end, the present invention further contemplates a fitting having separable parts adapted to receive the messenger cable therebetween and having the opposite ends respectively attachable to the supporting structure and to the electrical equipment to be installed. The construction of the fitting is such as to not only insure perfect alignment of the fittings on the messenger cable but, in addition, to permit expansion and contraction of the messenger cable without placing undue strain on the fittings or interfering with the position of the latter.

Another feature of this invention is to provide a fitting having a hollow part bifurcated at one end to receive the messenger between the furcations thereof and having a second hollow part removably secured to the bifurcated end of the first part to permit attaching the fitting to the supporting structure.

Another object of this invention is to provide a fitting having sufficient clearance at opposite sides of the messenger cable to permit extending a plurality of electrical conductors therethrough.

Still another feature of this invention is to provide a fitting having a saddle located between the furcations of the bifurcated part in a position to receive the portion of the messenger cable extending through the fitting and thereby serving to protect the electrical conductors from contact with the messenger.

A further object of this invention is to provide a fitting attachable to an outlet receptacle connected in a length of electrical conduit and permitting the conduit to be located in close proximity to the messenger cable. This is desirable in that it not only contributes to the economy of the installation but, in addition, provides a compact construction which occupies the minimum head room in the building.

Still another advantageous feature of the present invention is to provide a fitting comprising an outlet receptacle having a boss bifurcated to receive the messenger between the furcations thereof and having means for readily removably connecting the boss to the supporting structure. This construction renders it possible to locate the electrical conduit immediately adjacent the messenger, and this is advantageous for reasons set forth in the preceding paragraph.

The foregoing as well as other objects will be made more apparent as this description proceeds, especially when considered in connection with the accompanying drawings, wherein.

Figures 1, 2, 3:
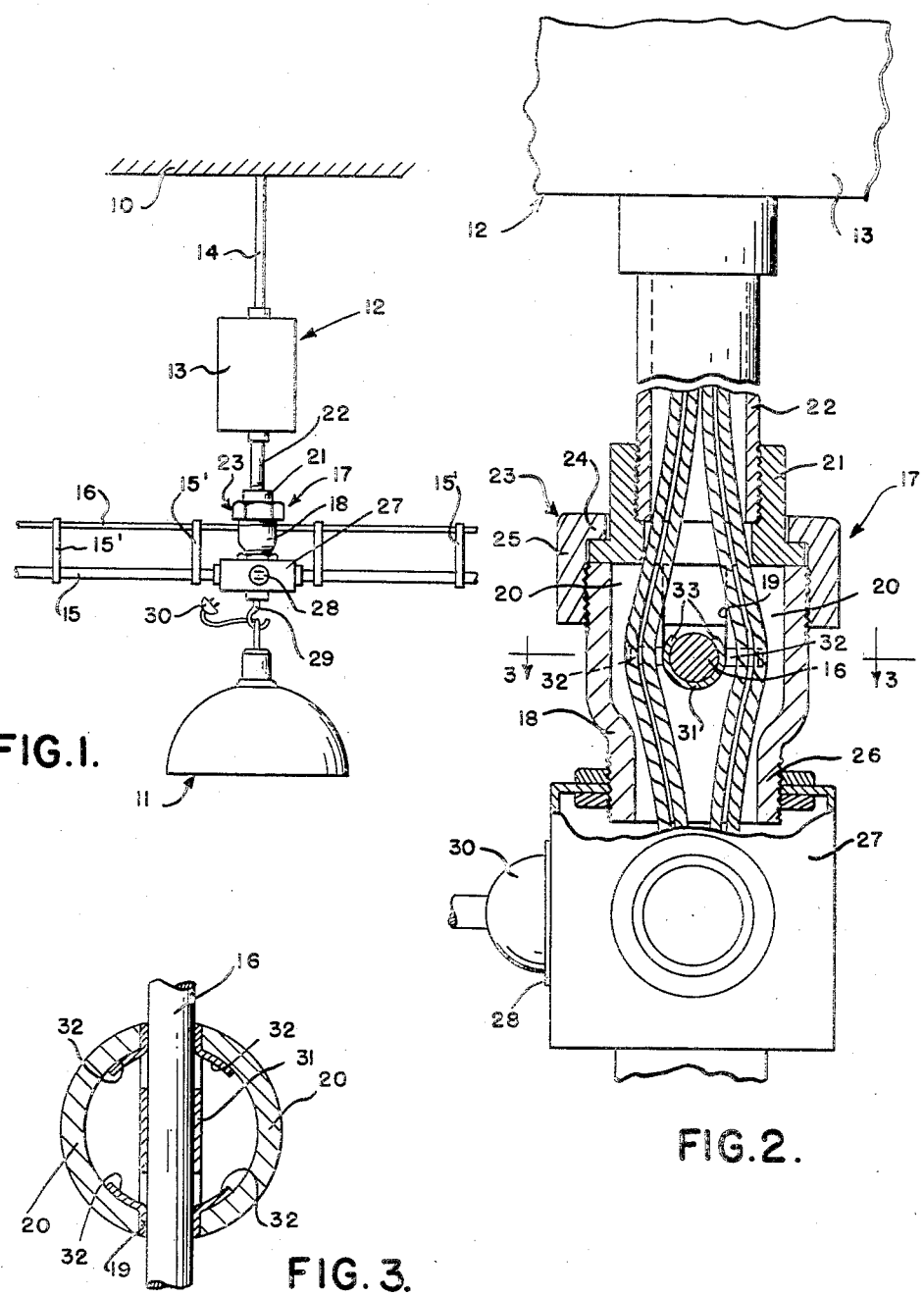
Figure 1 is a side elevational view of an electrical installation embodying my improved fitting construction.
Figure 2 is a longitudinal sectional view through the fitting shown in Figure 1.
Figure 3 is a cross sectional view taken on the line 3—3 of Figure 2.

In Figure 1 of the drawings, I have illustrated the manner in which my improved fitting may be used in the installation of illuminating lamps of the type employed in industrial plants. However, it will be understood as this description proceeds that the fitting is not limited to the specific installation set forth above and may be advantageously used in practically any installation requiring the suspension of a messenger from the building structure.

Referring more in detail to Figure 1, it will be noted that the reference character 10 designates a part of the superstructure usually employed in industrial plants, and the reference character 11 indicates a lighting fixture of the type requiring a power pack 12 for its successful operation. In the present instance, the power pack comprises a transformer 13 suspended from the building structure 10 by means of a hanger 14 detachably secured to the upper end of the transformer in any suitable manner.

When installing units of the above type in industrial plants, it is customary to arrange the required number of lighting fixtures in alignment with each other and in proper spaced relationship. Each lighting fixture 11 and associated power pack 12 is supplied with electrical energy through the medium of a conduit 15 having the required number of electrical conductors extending therethrough and adapted to be suspended from a messenger cable 16 by a plurality of straps 15'. The messenger cable 16 is suspended from the building structure 10 by means of the hangers 14 and, in the present instance, is connected to the lower end of each transformer 13 by means of a fitting 17, one of which is shown in the drawings.

Upon reference to Figure 2, it will be noted that the fitting 17 comprises a tubular part 18 having the upper end bifurcated to provide a passage 19 through the fitting between the furcations 20. The passage 19 is of sufficient width to freely receive the messenger cable 16 and permits extending the latter through the fitting. It will, also, be observed from Figure 2 that the fitting 17 comprises a second tubular part 21 having a radially outwardly extending flange at the lower end adapted to seat on the upper end of the part 18. The upper end of the part 21 is internally threaded for attachment to the lower end of a conduit 22 having the upper end threadedly connected to the transformer 13. The two parts are readily detachably secured together by means of a coupling 23 having a radially inwardly extending annular shoulder 24 engageable with the radially outwardly extending flange on the part 21 and having a cylindrical portion 25 threaded on the upper end of the part 18.

With the above arrangement, it will be noted that the messenger cable 16 and associated electrical conduit 15 may be readily attached to the hangers 14 by merely positioning each of the fitting parts 18 on the messenger cable 16 in such a manner that the latter passes between the furcations 20 at the upper end of each fitting part 18. The parts 21 of the fitting may then be readily secured to the upper ends of the parts 18 by merely manipulating the couplings 23. Inasmuch as the fitting part 21 is secured to the power pack 12 by the conduit 21 and, in view of the fact that the power pack is connected to the hanger 14, it follows that the messenger cable is suspended at spaced points from the building structure 10. The above construction also insures supporting the several lighting fixtures in perfect alignment with each other and permits expansion or contraction of the messenger cable without placing undue strain on the fitting 17 or without interfering with the position of the latter.

The lower end of the part 18 of the fitting 17 is provided with a reduced portion 26 externally threaded for direct attachment to a suitable outlet receptacle 27. One outlet receptacle 27 is provided opposite each lighting fixture 11 and these receptacles are connected in the length of conduit 15 in accordance with conventional practice. In the present instance, electrical conductors extending through the conduit 15 from the source of supply are directed from the outlet 27 through the fitting 17 to the input side of the power pack 12. Additional electrical conductors are extended from the output side of the power pack 12 through the fitting 17 into the outlet receptacle 27 and are connected to a suitable socket 28 carried by the one side wall of the outlet receptacle.

As shown in Figure 1, a hook 29 is secured to the bottom wall of the outlet receptacle 27 for removably supporting the lighting fixture 11, and electrical energy is supplied to the lighting fixture from the power pack 12 by electrical conductors having a plug 30 adapted to be removably secured in the socket 28. As a result, the lighting fixture may be readily removed for cleaning or repair purposes without interfering with the fitting 17 or associated parts.

Upon reference to Figure 2, it will be noted that the electrical conductors extending through the fitting 17 are positioned at opposite sides of the portion of the messenger cable 16 which extends through the passage 19 in the fitting part 18. As a result, the fitting also forms a raceway for the electrical conductors extending between the lighting fixture and power pack 12. In the present instance, the electrical conductors extending through the fitting 17 are protected from contact with the messenger cable 16 so that relative movement between the latter and fitting will no effect undue wear of the insulating material surrounding the electrical conductors. Upon reference to Figure 3, it will be noted that a saddle 31, preferably formed of an insulating material, is secured to the part 18 of the fitting between the furcations 20 in a position to receive the portion of the messenger cable 16 extending through the fitting. It will also be observed from Figure 3 that lugs 32 are struck out from opposite ends of the saddle in a manner to engage the inner surfaces of the furcations at opposite sides of the fitting part 18. As a result, the saddle 16 is secured to the fitting 17 against endwise movement relative thereto. It may also be pointed out that the material from which the saddle 31 is formed possesses sufficient resiliency to permit the opposite edges 33 of the saddle to be snapped over the messenger cable during assembly.

Figure 4:
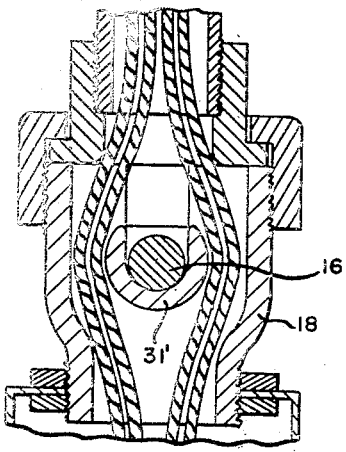
Figure 4 is a sectional view showing a slightly modified form of fitting construction.

In Figure 4 of the drawings, I have illustrated a fitting which is identical to the fitting 17 previously described with the exception that the saddle 31' is cast integral with the fitting part 18. The saddle 31' will also permit relative movement between the fitting and cable without causing a rubbing action between the electrical conductors and the messenger cable.

Figure 5:
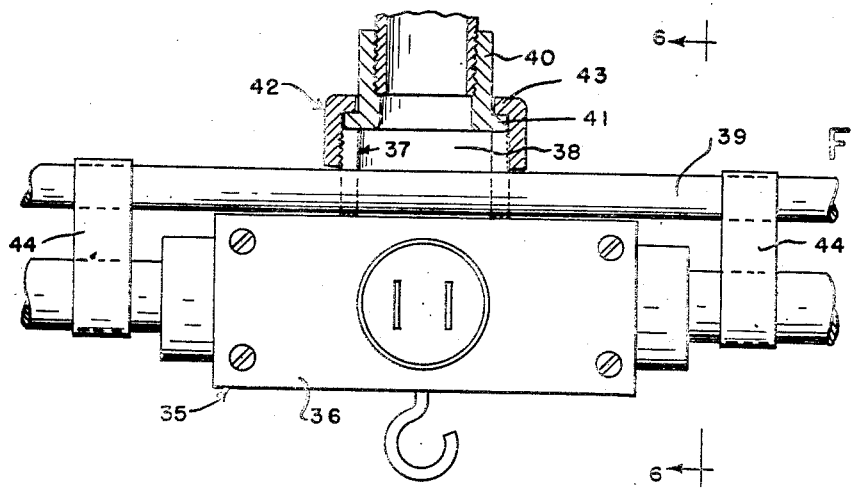
Figure 5 is a side elevational view partly in section of still another embodiment of this invention.
Figure 6:
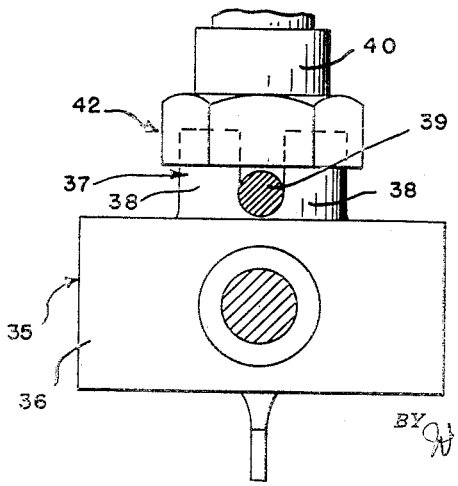
Figure 6 is a cross sectional view taken substantially on the plane indicated by the line 6—6 of Figure 5.

Referring now to the embodiment of the invention illustrated in Figures 5 and 6, it will be noted that the fitting 35 comprises an outlet receptacle 36 similar in construction to the outlet receptacle previously described with the exception that the top wall of the receptacle 36 is provided with an externally threaded boss 37. The diametrically opposite side walls of the boss 37 are slotted to provide laterally spaced furcations 38 adapted to receive the messenger cable 39 therebetween.

In addition, it will be noted that the fitting 35 comprises a tubular part 40 having a laterally outwardly extending flange 41 at the lower end adapted to seat on the upper end of the boss 37. The part 40 is removably connected to the boss 37 by means of a coupling 42 having a cylindrical portion threadedly mounted on the boss 37 and having a radially inwardly extending annular shoulder 43 cooperating with the annular flange 41 on the part 40 to clamp the latter to the boss 37. The part 40 of the fitting is internally threaded and is connected to the power pack for the lighting fixture in substantially the same manner described in connection with the first embodiment of this invention.

The above construction possesses the further advantage of reducing to the minimum the space between the messenger cable 39 and the conduit for the electrical supply conductors. As a result, the length of the straps 44 for suspending the electrical conduit from the messenger may be reduced to the minimum, and this not only reduces the cost of installation but, also occupies the minimum head room in the building. It may also be pointed out at this time that, as in the first described form of the invention, the electrical conductors extend through the space provided in the boss 37 at opposite sides of the messenger cable 39 and, owing to the compact assembly, the length of the electrical conductors required is also reduced to the minimum. This contributes materially to the reduction in cost of the installation and is, therefore, advantageous.

Thus, from the foregoing, it will be observed that I have provided a relatively simple, inexpensive fitting which renders it possible to appreciably simplify and expedite the installation of electrical equipment. It will also be noted that the fitting is constructed to form a raceway for the electrical conductors extending between the power unit and lighting fixture. This is advantageous in that it insures installing the fixtures in perfect alignment with each other. In addition to the above, it will be noted that my improved fixture construction renders it possible to support the conduit for the electrical conductors in close proximity to the messenger cable, and this is desirable because it provides for obtaining a more compact installation which occupies the minimum head room in the building.

What I claim as my invention is:

1. In combination, supporting structure, a linear supporting member, a conduit located below the linear supporting member and suspended from said member, and means for suspending the linear supporting member from the supporting structure including a fixture having separable parts adapted to receive the linear supporting member therebetween and having passageways at opposite sides of the linear supporting member, and electrical conductors extending from a point above the fixture through the passageways to the conduit below the fixture.

2. A fitting having a hollow part bifurcated at one end to receive a supporting element between the furcations thereof and to provide passageways for electrical conductors at opposite sides of the supporting element, and another part of said fitting removably secured to the bifurcated end of the first part and also being hollow to provide for extending electrical conductors therethrough.

3. A fitting having a hollow part bifurcated at one end to receive a supporting element between the furcations thereof and having passageways for electrical conductors at opposite sides of the supporting element, a saddle between the furcations for receiving the supporting element and to protect the electrical conductors from the supporting element, and another part of said fitting removably secured to the bifurcated end of the first part and also being hollow to permit extending the electrical conductors therethrough.

4. The combination with electrical equipment, a linear supporting member, a conduit for electrical conductors suspended from the linear supporting member, of means for supporting the linear supporting member below the electrical equipment including a fitting having a passage therethrough for receiving the linear supporting member and having passages therein at opposite sides of the linear supporting member for accommodating electrical conductors extending between the conduit and electrical equipment and means connecting the fitting to supporting structure.

5. In combination, supporting structure, electrical equipment carried by said structure, a linear supporting member, a conduit for electrical conductors suspended from the linear member, means connecting the linear supporting member to the supporting structure including a fitting having a hollow part bifurcated at one end to receive the linear supporting member between the furcations thereof and having passageways at opposite sides of the linear supporting member for electrical conductors extending between the conduit and electrical equipment, and said fitting having another part removably mounted on the bifurcated end of the first part and also being hollow to permit extending the electrical conductors therethrough.

6. In combination, a linear supporting member, a conduit for electrical conductors suspended from the linear supporting member and having an outlet receptacle, electrical equipment at the opposite side of the linear supporting member, means for supporting the linear member including a fitting provided with a hollow part bifurcated at one end to receive the linear supporting member between the furcations thereof and having sufficient space at opposite sides of the linear supporting member for electrical conductors extending between the electrical equipment and outlet receptacle, means at the opposite end of said part for connecting the latter to said outlet receptacle, and said fitting having another part removably secured to the bifurcated end of the first part and being hollow to permit the passage of the electrical conductors therethrough.

7. In combination, electrical equipment, a linear supporting member, a conduit containing electrical conductors suspended from the linear supporting member, means for supporting the linear member including a hollow fitting having a passage therethrough for receiving the linear supporting member and having sufficient clearance at opposite sides of the supporting member for accommodating electrical conductors extending between the conduit and electrical equipment, and means protecting the electrical conductors from contact with the linear supporting member.

8. In combination, supporting structure, electrical equipment carried by said structure, a linear supporting member, a conduit for electrical conductors suspended from the linear supporting member, means connecting the linear member to the supporting structure including a fitting having a hollow part bifurcated at one end to receive the linear supporting member between the furcations thereof and having passageways at opposite sides of the linear member for electrical conductors extending between the conduit and electrical equipment, a saddle between the furcations for receiving the linear supporting member and protecting the electrical conductors from contact with the linear member, and said fitting having another part removably mounted on the bifurcated end of the first part and also being hollow to permit extending the electrical conductors therethrough.

9. In combination, supporting structure, electrical equipment carried by said structure, a linear supporting member, a conduit for electrical conductors suspended from the linear supporting member, means connecting the linear member to the supporting structure including a fitting having a hollow part bifurcated at one end to receive the linear supporting member between the furcations thereof and having passageways at opposite sides of the linear member for electrical conductors extending between the conduit and electrical equipment, a saddle located between the furcations of the first part for receiving the linear supporting member to protect the electrical conductors from contact with the supporting member and having the opposite ends respectively secured to the diametrically opposite sides of said part, and said fitting having another part removably secured to the birfurcated end of the first part and also being hollow to permit extending the electrical conductors therethrough.

10. A fitting comprising an outlet receptacle having a boss extending from one wall and bifurcated at one end to receive a linear supporting member between the furcations thereof, and a member secured to the bifurcated end of the boss and having means for connecting the same to supporting structure.

11. A fitting comprising an outlet receptacle having a hollow boss extending from one wall and bifurcated at the outer end to receive a messenger cable between the furcations thereof and having passageways at opposite sides of the messenger cable to provide for extending electrical conductors through the fitting into the receptacle, and a hollow member removably secured to the bifurcated end of the boss and also adapted to receive the electrical conductors.

12. In combination, supporting structure, a linear supporting member suspended from the supporting structure, means for connecting the linear member to the supporting structure including a fixture positioned directly below the linear supporting member and comprising an outlet receptacle for receiving electrical conductors, said outlet receptacle having a hollow boss extending from the top of the receptacle wall and bifurcated at the upper end to receive the linear supporting member between the furcations thereof and to provide passageways at opposite sides of the linear supporting member for electrical conductors, and a hollow member removably secured to the bifurcated end of the boss and adapted to receive the electrical conductors extending through said boss.

JACOB E. AVERBACH.